US012590021B2

(12) United States Patent
Zitomer et al.

(10) Patent No.: US 12,590,021 B2
(45) Date of Patent: Mar. 31, 2026

(54) SYSTEM AND METHODS FOR WASTEWATER TREATMENT

(71) Applicant: Marquette University, Milwaukee, WI (US)

(72) Inventors: Daniel Zitomer, Shorewood, WI (US); Paige E. Peters, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 765 days.

(21) Appl. No.: 17/881,461

(22) Filed: Aug. 4, 2022

(65) Prior Publication Data

US 2022/0380244 A1 Dec. 1, 2022

Related U.S. Application Data

(63) Continuation-in-part of application No. PCT/US2021/016928, filed on Feb. 5, 2021.
(Continued)

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/008* (2013.01); *C02F 1/004* (2013.01);
(Continued)

(58) Field of Classification Search
None
See application file for complete search history.

(56) References Cited

U.S. PATENT DOCUMENTS

2005/0139530 A1* 6/2005 Heiss ........................ C02F 9/00
210/257.2
2010/0301498 A1* 12/2010 Matsumura ......... B01F 23/2326
261/118
(Continued)

OTHER PUBLICATIONS

Bader et al., Determination of Ozone in Water by the Indigo Method, Water Research, 1981, 15(4):449-456.
(Continued)

*Primary Examiner* — Richard C Gurtowski
(74) *Attorney, Agent, or Firm* — Quarles & Brady LLP

(57) ABSTRACT

The present disclosure provides an apparatus comprising a primary treatment system configured to remove solids from an untreated fluid to generate a primary treated fluid. The apparatus further comprises an oxidation treatment system including an inlet configured to receive the primary treated fluid, an ozone inlet configured to receive ozone from an ozone generator, and an outlet configured to dispense secondary treated fluid. The apparatus may further comprise a controller in electrical communication with the ozone generator. The controller is programmed to regulate the flow of ozone through the oxidation treatment system such that an effective amount of ozone contacts the primary treated fluid to generate the secondary treated fluid. In some embodiments, the secondary treated fluid discharging from the oxidation treatment system has a chemical oxygen demand (COD) removal level of greater than 85%.

16 Claims, 7 Drawing Sheets

Related U.S. Application Data

(60) Provisional application No. 62/970,584, filed on Feb. 5, 2020.

(51) Int. Cl.
      *C02F 1/52*        (2023.01)
      *C02F 1/78*        (2023.01)

(52) U.S. Cl.
      CPC ...... *C02F 2001/007* (2013.01); *C02F 1/5245* (2013.01); *C02F 1/78* (2013.01); *C02F 2201/782* (2013.01); *C02F 2209/235* (2013.01); *C02F 2209/40* (2013.01); *C02F 2303/04* (2013.01)

(56) References Cited

U.S. PATENT DOCUMENTS

| | | | |
|---|---|---|---|
| 2013/0168318 A1* | 7/2013 | Levecq | C02F 1/56 210/666 |
| 2015/0144564 A1* | 5/2015 | Moller | C02F 1/283 210/201 |
| 2017/0217802 A1* | 8/2017 | Kostedt, IV | C02F 1/5236 |
| 2019/0233315 A1* | 8/2019 | Segues | C02F 1/78 |

OTHER PUBLICATIONS

Boncz, Selective Oxidation of Organic Compounds in Waste Water by Ozone-Based Oxidation Processes, Thesis, Submitted to Wageningen University, 2002, pp. 1, 7, 36, 50-53 [in six parts due to file size].

Copeland et al., Water Infrastructure Needs and Investment: Review and Analysis of Key Issues, CRS Report for Congress: Prepared for Members and Committees of Congress, 2010, 40 pages [in two parts due to file size].

Even et al., Modelling Oxygen Deficits in the Seine River Downstream of Combined Sewer Overflows, Ecological Modelling, 2004, 173(2-3):177-196.

Gasperi et al., Priority Pollutants in Wastewater and Combined Sewer Overflow, Science of the Total Environment, 2008, 407(1):263-272.

Gehr et al., Disinfection Efficiency of Peracetic Acid, UV and Ozone After Enhanced Primary Treatment of Municipal Wastewater, Water Research, 2003, 37(19):4573-4586.

Grabbe et al., Upgrading of Waste Water Treatment Plants by Cloth-Filtration Using an Improved Type of Filter-Cloth, Water Science and Technology, 1998, 37(9):143-150.

Grau et al., Kinetics of Multicomponent Substrate Removal by Activated Sludge, Water Research, 1975, 9(7):637-642.

Hunt et al., Kinetics of *Escherichia coli* Inactivation with Ozone, Water Research, 1997, 31(6):1355-1362.

Jagai et al., Sanitary Sewer Overflows and Emergency Room Visits for Gastrointestinal Illness: Analysis of Massachusetts Data, 2006-2007, Environmental Health Perspectives, 2017, 125(11):117007, pp. 1-7.

Karrer, Applicability Test for Combined Biological-Chemical Treatment of Wastewaters Containing Biorefractory Compounds, Water Research, 1997, 31(5):1013-1020.

López-López et al., Influence of t-butanol and of pH on Hydrodynamic and Mass Transfer Parameters in an Ozonation Process, Chemical Engineering and Processing: Process Intensification, 2007, 46(7):649-655.

Lucas et al., Treatment of Winery Wastewater by Ozone-Based Advanced Oxidation Processes (O3, O3/UV and O3/UV/H2O2) in a Pilot-Scale Bubble col. Reactor and Process Economics, Separation and Purification Technology, 2010, 72(3):235-241.

Mclellan et al., Marine and Freshwater Fecal Indicators and Source Identification, Encyclopedia of Sustainability and Technology, 2014, 81-100.

Newton et al., A Microbial Signature Approach to Identify Fecal Pollution in the Waters Off an Urbanized Coast of Lake Michigan, Microbial Ecology, 2013, 65(4):1011-1023.

Pal et al., Emerging Contaminants of Public Health Significance as Water Quality Indicator Compounds in the Urban Water Cycle, Environment International, 2014, 71:46-62.

Passerat et al., Impact of an Intense Combined Sewer Overflow Event on the Microbiological Water Quality of the Seine River, Water Research, 2011, 45(2):893-903.

Phillips et al., Wastewater Effluent, Combined Sewer Overflows, and Other Sources of Organic Compounds to Lake Champlain, Journal of the American Water Resources Association, 2009, 45(1):45-57.

Quero-Pastor et al., Ozonation of Ibuprofen: A Degradation and Toxicity Study, Science of the Total Environment, 2014, 466:957-964.

Rakness et al., Guideline for Measurement of Ozone Concentration in the Process Gas from an Ozone Generator, Ozone: Science and Engineering, 1996, 18(3):209-229.

Riechel et al., Impacts of Combined Sewer Overflows on a Large Urban River—Understanding the Effect of Different Management Strategies, Water Research, 2016, 105:264-273.

Schutte, Handbook for the Operation of Water Treatment Works, 2006, pp. 77-78, 84, 93, 164-165, 204 [in eight parts due to file size].

Van Der Walt, The South African Oxidation and Disinfection Manual, 2009, pp. 27-28, 46-46, 48-49, 72, 77-78, 82, 84, 97, 101 [in four parts due to file size].

Xu et al., Wastewater Disinfection by Ozone: Main Parameters for Process Design, Water Research, 2002, 36(4):1043-1055.

PCT International Search Report and Written Opinion, PCT/US2021/016928, May 20, 2021, 13 pages.

* cited by examiner

SYSTEM AND METHODS FOR WASTEWATER TREATMENT

CROSS-REFERENCE TO RELATED APPLICATIONS

This application is a Continuation-In-Part of PCT/US2021/016928 with an international filing date of Feb. 5, 2021, which claims the benefit of priority to U.S. Provisional Application No. 62/970,584 filed on Feb. 5, 2020. The entire contents of each of the above-referenced applications are incorporated by reference herein.

BACKGROUND

Combined sewer overflows (CSOs), sanitary sewer overflows (SSOs), and basement backups caused by intense precipitation events pose both environmental and public health risks. Though diluted by rainwater, CSOs and SSOs contain a combination of contaminants due to the presence of both sanitary wastewater and stormwater purposely collected in sewers or resulting from infiltration and inflow (I&I) (Gasperi et al., 2008; Phillips & Chalmers, 2009). Receiving water effects of CSOs and SSOs can last for days after a storm event, including oxygen deficits due to high concentrations of organic matter and an increase in illnesses associated with exposure to human pathogens (Even et al., 2004; Passerat et al., 2011; Newton et al., 2013; Jagai et al., 2017). Across the United States, rivers and lakes are consistently designated as impaired due, in part, to contamination from sewer overflows (McLellan et al., 2014; Pal et al., 2014). Aging infrastructure in the time of increased urbanization has exacerbated the impact of sewerage systems on the natural environment (Copeland & Tiemann, 2010; Riechel et al., 2016).

As water quality policy changes, technology innovations in wet weather treatment technology have also evolved to respond to aging infrastructure, increased urbanization, and more extreme weather events. Conventional wet weather management relies on storage through deep tunnels or basins which hold the CSO water until it can be pumped and treated after a storm event. In urban settings, the footprint area needed for storage may be difficult or expensive to obtain and the expense can be difficult to justify to ratepayers. Currently, there is a need in the art for systems and methods of treating CSO and SSO events, when existing infrastructure is inadequate to handle overflows.

SUMMARY

Some embodiments of the present disclosure provide an apparatus comprising a primary treatment system configured to remove solids from an untreated fluid to generate a primary treated fluid. The apparatus further comprises an oxidation treatment system including an inlet configured to receive the primary treated fluid, an ozone inlet configured to receive ozone from an ozone generator, and an outlet configured to dispense secondary treated fluid. The apparatus may further comprise a controller in electrical communication with the ozone generator. The controller is programmed to regulate the flow of ozone through the oxidation treatment system such that an effective amount of ozone contacts the primary treated fluid to generate the secondary treated fluid. In some embodiments, the secondary treated fluid discharging from the oxidation treatment system has a chemical oxygen demand (COD) removal level of greater than 85%.

In other embodiments, the present disclosure provides a method comprising feeding an untreated fluid to a primary treatment system configured to remove solids from the untreated fluid to generate a primary treated fluid. The method further comprises oxidizing the primary treated fluid in an oxidation treatment system having an inlet configured to receive the primary treated fluid, an ozone inlet configured to receive ozone from an ozone generator, and an outlet configured to dispense secondary treated fluid, and wherein the flow of ozone through the oxidation treatment system is controlled such that an effective amount of ozone contacts the primary treated fluid to generate the secondary treated fluid, wherein the secondary treated fluid discharging from the oxidation treatment system has a chemical oxygen demand (COD) removal level of greater than 85%.

BRIEF DESCRIPTION OF THE DRAWINGS

The following figures depict certain illustrative implementations of the compositions, apparatuses, and methods described herein, where like reference numerals refer to like elements. Each depicted implementation is illustrative of the compositions, apparatuses, and methods and should not be construed to be limited.

DETAILED DESCRIPTION

Figure 1:
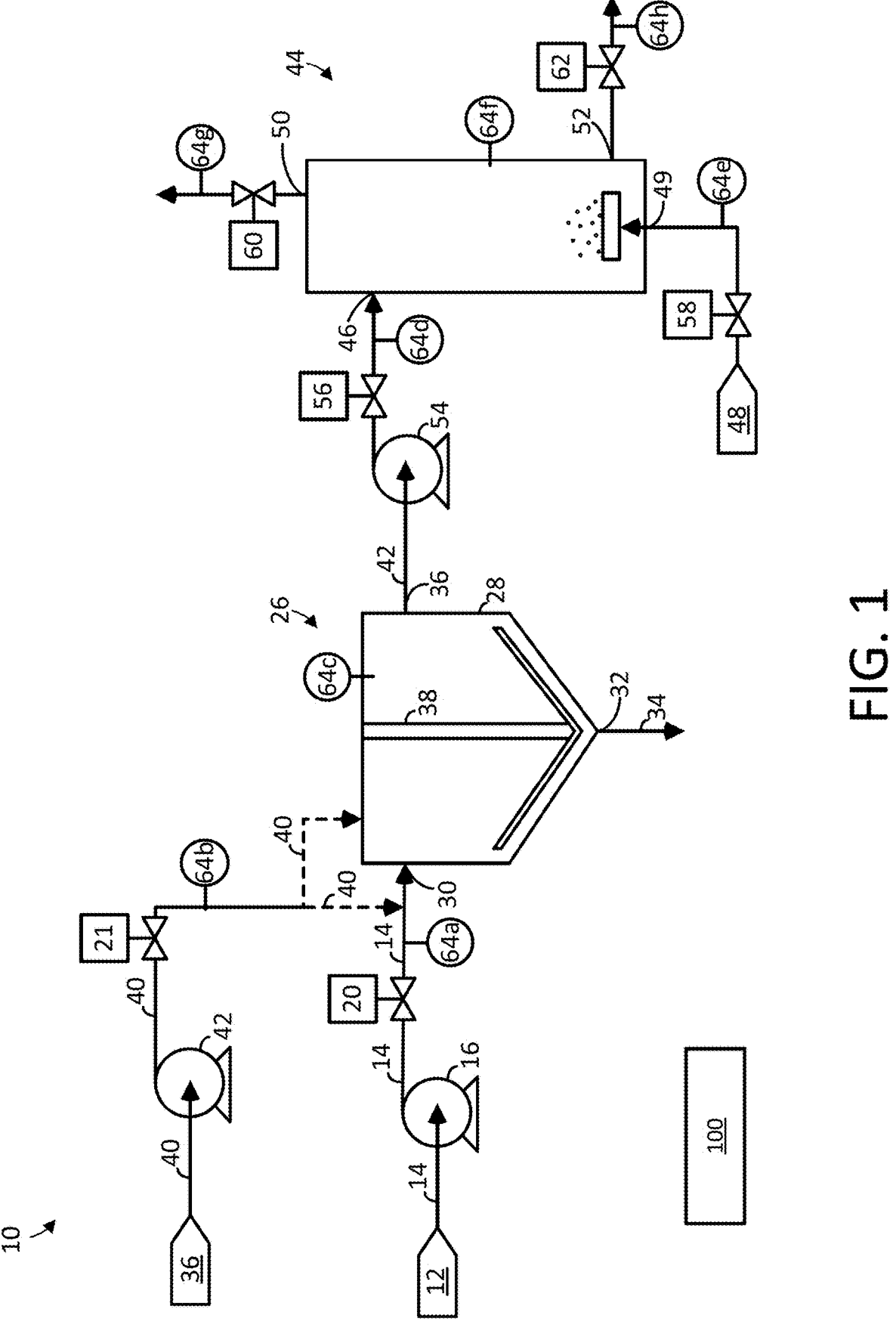
FIG. 1 is an apparatus for treating wastewater in accordance with some embodiments of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Unless otherwise specified or indicated by context, the terms "a", "an", and "the" mean "one or more." For example, "a component" of as system and "a step" of a method should be interpreted to mean "one or more components" and "one or more steps," respectively.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus $\leq 10\%$ of the particular term and "substantially" and "significantly" will mean plus or minus $>10\%$ of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

Unless specified or limited otherwise, the terms "mounted," "connected," "supported," "coupled," "attached," and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an apparatus 10 for treating a wastewater fluid stream, such as a combined sewer overflow (CSO) or a sanitary sewer overflow (SSO). The apparatus 10 includes a feedline 14 that places an untreated fluid stream 12 in fluid communication with a primary treatment system 26. In some embodiments, the primary treatment system 26 includes porous filtration media configured to remove solids from the untreated fluid stream to generate a primary treated fluid. In some embodiments, the porous filtration media may include cloth filtration media, a polymeric membrane configured as a dead-end membrane or as a cross-flow membrane that generates a permeate and a retentate.

As illustrated in FIG. 1, in some embodiments, the primary treatment system 26 includes a chemically enhanced primary treatment (CEPT) system 26. The untreated fluid stream 12 may be transported to the CEPT system 26 via a pump 16. A valve 20 may be placed in the feedline 14 to regulate the flowrate of untreated fluid to the CEPT system 26.

In some embodiments, the CEPT system 26 includes a sedimentation vessel 28 having an inlet 30 that places the sedimentation vessel 28 in fluid communication with the untreated fluid stream 12. The sedimentation vessel 28 may include one or more chemical additive within the vessel 28, such as a clarifying agent and/or disinfectant, that promotes flocculation, coagulation, and/or disinfection of the untreated fluid stream 12. In some embodiments, contacting the chemical additives to the untreated fluid stream 12 generates solids, which are separated from a primary treated fluid stream 42 via sedimentation. The solids may be discharged from the sedimentation vessel 28 through a sedimentation outlet 32, which may be transported to an additional process unit or discarded via a sedimentation line 34. The primary treated fluid stream 42 is discharged from the sedimentation vessel 28 through a primary treated fluid outlet 36.

In some embodiments, the CEPT system 26 may include an agitator 38 that is rotatably attached within the sedimentation vessel 28 to promote mixing and agitation. The CEPT system 26 may optionally include a plurality of baffles (not shown) configured to the side walls of the sedimentation vessel 28 to enhance mixing.

In some embodiments, the apparatus 10 includes a reagent dosing unit 36 that is configured to supply one or more chemical additives to the CEPT system 26. A pump 42 may be configured to place the reagent dosing unit 36 in fluid communication with the CEPT system 26 via a reagent line 40. A valve 21 may be placed in the reagent line 40 to regulate the flowrate of the chemical additives to the CEPT system 26. In some embodiments, the reagent line 40 directly discharges into the CEPT system 26, and/or blends with the feedline 14.

Suitable chemical additives include, but are not limited to, flocculants, coagulants, and/or polyelectrolytes. As used herein, the term "flocculants" may refer to chemical compounds or entities that promote flocculation. Flocculation may induce colloids and other suspended particles in the untreated fluid stream 12 to aggregate, forming a "floc" that settles and separates from the primary treated fluid stream. Exemplary flocculants include, but are not limited to, ferric chloride ($FeCl_3$), alum $Na_2(SO_4)_3$, and organic polyelectrolytes, such as polysaccharide gums, or synthetic polyelectrolytes.

As used herein, the term "coagulants" may refer to chemical compounds or entities that react with charged impurities within the untreated fluid stream 12 to neutralize the impurities or particles within the untreated fluid stream 12. Neutralizing the impurities or particles via a coagulant promotes sedimentation and clumping of the particles. Exemplary coagulants include, but are not limited to, iron-based or aluminum-based ions, such as aluminum sulfate, aluminum chloride, polyaluminum chloride, sodium aluminate, ferric sulfate, ferrous sulfate, and ferric chloride, or lime ($Ca(OH)_2$ or $CaO$).

As used herein, the term "polyelectrolyte" may refer to polymers whose repeating units bear an electrolyte group, such as polyanions and polycations. Polyelectrolytes may facilitate both coagulation and flocculation of the untreated fluid stream 12.

In some embodiments, the primary treatment system 26 includes a combination of porous filtration media and the CEPT system. The porous filtration media may be configured before or after the CEPT system to generate the primary treated fluid.

Figure 10:
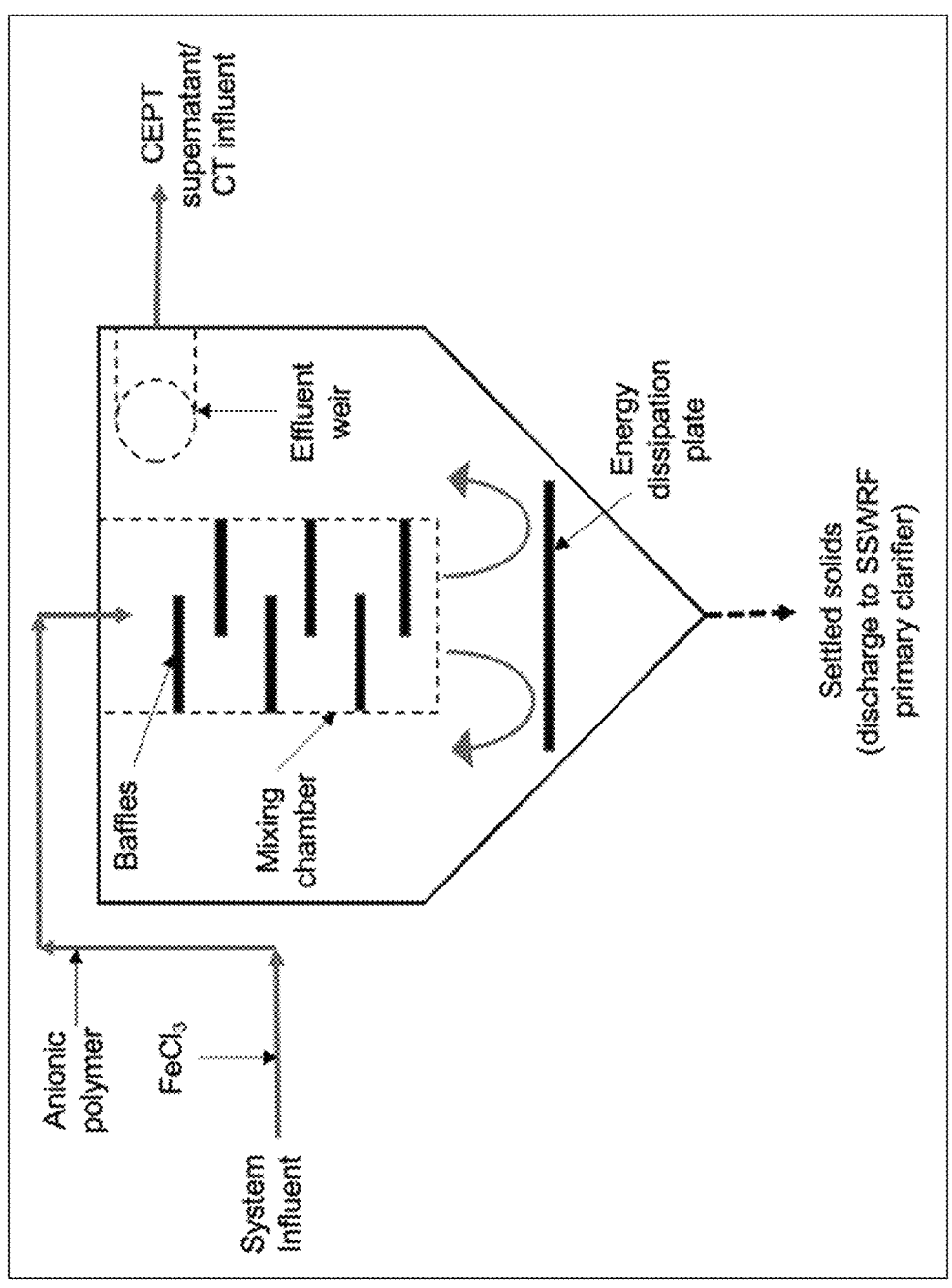
FIG. 10 is a profile view of an exemplary sedimentation vessel of a CEPT system as disclosed herein.

By way of example only, and not by way of limitation, an embodiment of a sedimentation vessel of a CEPT system is provided in FIG. 10. As shown in FIG. 10, both ferric chloride (FeCl₃) coagulant (e.g., 40% w/v solution, Ricca Chemical Company, Arlington, TX) and an anionic polymer coagulant aid (e.g., Praestol A4060, Solenis, Wilmington, DE) may be employed in the CEPT process. Each chemical may be pumped into the system influent line using, for example, a peristaltic pump. Chemical injection locations may be in the same location or may be staggered, and chemicals may be added in sequence or simultaneously. In some embodiments, chemicals are added sequentially. In some embodiments, the CEPT system comprise a sedimentation vessel, such as, for example, a cone-shaped container as shown in both FIG. 1 and FIG. 10, although as known in the art, other tank shapes may be used. In some embodiments, the volume of the sedimentation vessel can be modified to suit the intended use, and may be 50-100 gallons, 100-100,000 gallons, or more. In some embodiments, the sedimentation vessel is elevated so the settled solids can be periodically drained from the bottom and the CEPT supernatant/CT influent could flow by gravity over the effluent weir at the top of the sedimentation vessel (FIG. 10). In some embodiments, the sedimentation tank comprises a plurality of baffles fixed to an inlet mixing chamber to promote mixing and particle interaction/flocculation for subsequent coagulation. In some embodiments, an energy dissipation plate may be included, and may be placed 8-10 inches below the mixing chamber (represented by dotted line in FIG. 10) outlet to decrease convective water velocity for increased solids removal. The dissipator also creates a quiescent space below it with lower turbulence to allow a solids blanket to form without concern of significant resuspension. The CEPT supernatant/CT influent can then flow into an equalization tank (EQ2) and subsequently be pumped into the oxidation treatment system (CT influent).

The apparatus 10 of FIG. 1 typically further includes at least one oxidation treatment system 44. Although FIG. 1 depicts a single oxidation treatment system 44, it is to be appreciated that a plurality of oxidation treatment systems 44 may be connected in series. For example, the apparatus 10 may include at least one oxidation treatment system 44, at least two, at least three, at least four, at least five, at least ten, to less than 15, less than 20, less than 25, less than 30, or less than 50 oxidation treatment systems 33. In some embodiments, the oxidation treatment system 44 typically includes one or more of a primary fluid inlet 46, an ozone inlet 49, a vent 50, and a secondary treatment fluid outlet 52. In some embodiments, the oxidation treatment system 44 includes an ozone generator or source 48 to provide a source of ozone to the ozone inlet 49. The primary fluid inlet 46 is configured to receive the primary treatment fluid 42 from the CEPT system 26. A pump 54 may be configured to transport the primary treatment fluid 42 to the oxidation treatment system 44. The oxidation treatment system 44 may include valves 56, 58 to regulate the flowrate of primary treatment fluid 42 and ozone 48 into the system 44, respectively, and valves 60, 62 to regulate the flowrate of off gas and secondary treatment fluid discharging from the system 44, respectively. In some embodiments, a plurality of oxidation treatment systems is provided, and in some embodiments, the treated (ozonated) fluid flows or is pumped back into the environment, or flows or is pumped into one or more holding tanks. In some embodiments, the holding tank provides an aerobic environment, and in some embodiments, residual ozone in the treated fluid reacts with air in the holding tank, with no additional ozone injected into the holding tank.

Figure 2:
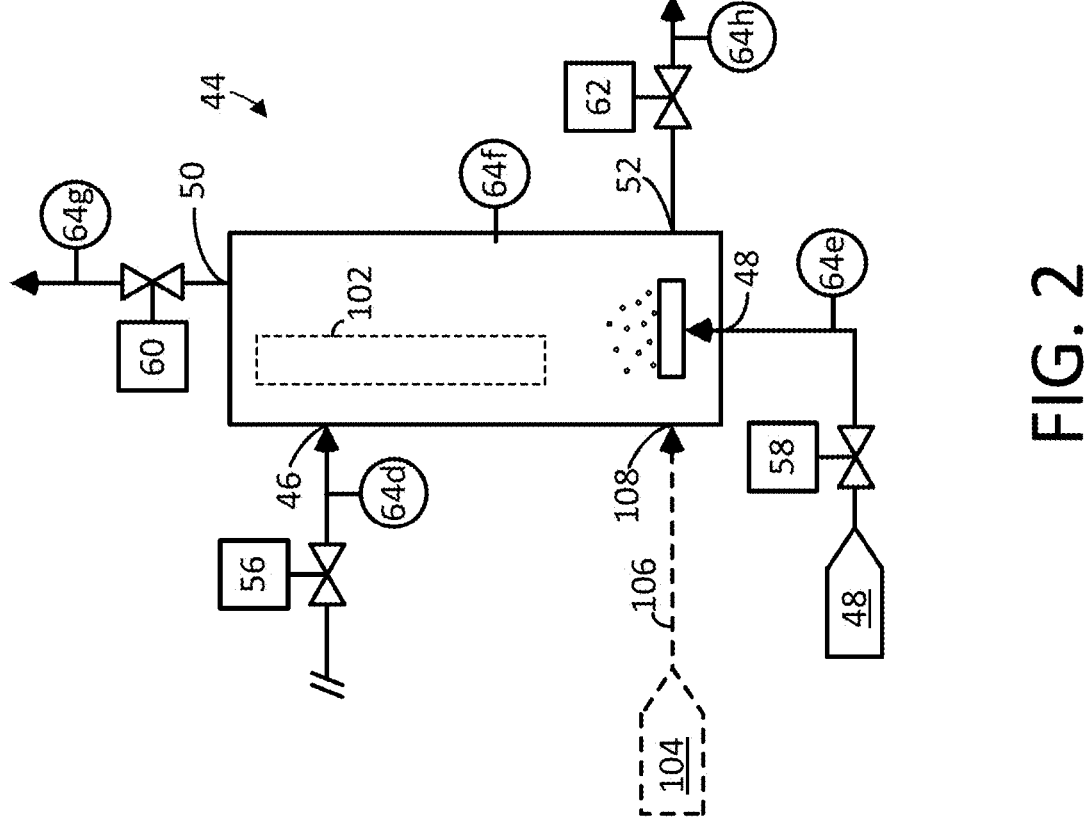
FIG. 2 is an oxidation treatment system in accordance with some embodiments of the present disclosure.

Referring to FIG. 2, the oxidation treatment system 44 may include an ultraviolet emitter 102 that is configured to irradiate at least a portion of the fluid in the oxidation treatment system 44. Additionally or alternatively, the oxidation treatment system 44 may include a hydrogen peroxide (H₂O₂) dosing unit 104. The hydrogen peroxide dosing unit 104 may be placed in fluid communication with the oxidation treatment system 44 via a hydrogen peroxide line 106 and a hydrogen peroxide inlet 108. In some embodiments, the oxidation treatment system 44 includes one or more catalysts disposed therein. Suitable catalysts include, but are not limited to, catalysts that promote oxidation.

Referring back to FIG. 1, in some embodiments, the apparatus 10 includes one or more process measuring devices (e.g., 64a-64h). The process measuring devices 64a-64h may be one or more sensors that are configured to measure a process parameter, such as pressure, flowrate, temperature, analyte concentration, fluid level, turbidity, and/or pH.

In some embodiments, the apparatus 10 includes a controller 100. The controller 100 may be configured to control the operation of the apparatus 10. For example, the controller 100 may assist in starting the process, stopping the process, and adjusting process parameters to change process performance. In some embodiments, the controller 100 is in electrical communication with the pumps 16, 42, and 54, the valves 20, 21, 56, 58, and 62, and the process measuring devices 64-64h.

In some embodiments, the controller 100 includes a processor and a memory that includes software and data, and is designed for storage and retrieval of processed information to be processed by the controller 100. The controller 100 includes an input that is configured to receive process signals from the one or more of the measuring devices (64a-64h), as well as the pumps 16, 42, and 54, and valves 20, 21, 56, 58, and 62 via the input.

Suitable connections may include transmitters that allow process signals, such as electrical signals or gas pressure signals (e.g., air, nitrogen, etc.), to be transmitted between the controller 100 and the measuring devices (e.g., 64a-64h), the pumps 16, 42, and 52, and the valves 20, 21, 56, 58. In some aspects, the electrical signals may be transferred via a wired connection or through a wireless network connection. Other hardware elements may be included in the process control system, for example, transducers, analog-to-digital (A/D) converters, and digital-to-analog (D/A) converters that allow process information to be recognizable in computer form, and computer commands accessible to the process. For visual clarity, the connections between the controller 100, the measuring devices (64a-64h), the pumps 16, 42, and 52, and valves 20, 21, 56, 58, and 62 have been omitted from FIG. 1.

The controller 100 may operate autonomously or semi-autonomously, or may read executable software instructions from the memory or a computer-readable medium (e.g., a hard drive, a CD-ROM, flash memory), or may receive instructions via the input from a user, or another source logically connected to a computer or device, such as another networked computer or server. For example, the server may be used to control the apparatus 10 via the controller 100 on-site or remotely, (e.g., cloud computing). In some embodiments, the controller 100 may include a wired user interface and/or a wireless user interface to facilitate controlling operations. A user may use the wired or wireless user interfaces to input parameters into the controller 100 to induce or manually control the process control actions discussed herein.

The controller 100 may process the input signals to generate an output, which may take the form of a process control action. Example process control actions may include sending signals to the pumps 16, 42, and 52, and valves 20, 56, 58, and 62 to effectuate a change in one or more process parameters (e.g., pressure, flowrate, temperature, and/or concentration of analyte) of one or more process streams in apparatus 10.

In some embodiments, the controller 100 includes programming to maintain a desired set-point concentration of the one or more chemical additive in the CEPT system 26. The set-point concentration of the one or more chemical additive in the CEPT system 26 may be maintained by altering the flowrate of chemical additives to the CEPT system 26 using the pump 42 and the valve 21. Additionally or alternatively, pumps 16, 54 and valves 20, 56, 58, 60, 62 may be altered to maintain the desired set-point concentration based on one or more measured values from the process measuring devices (64a-64h).

In some embodiments, the controller 100 includes programming to maintain a dose of flocculants to the CEPT system 26. In some embodiments, the dose of flocculants in the CEPT system 26 ranges from 0.1 mg/L to 100 mg/L. In some embodiments, the controller 100 includes programming to maintain a dose of flocculants in the CEPT system 26 to be at least 5 mg/L, at least 10 mg/L, at least 15 mg/L, at least 20 mg/L, at least 25 mg/L, at least 30 mg/L, or at least 35 mg/L, or at least 40 mg/L. In some embodiments, the controller 100 includes programming to maintain a dose of flocculants to be at most 45 mg/L, or at most 50 mg/L, or at most 55 mg/L, or at most 60 mg/L, or at most 65 mg/L, or at most 70 mg/L, or at most 75 mg/L, or at most 80 mg/L, or at most 85 mg/L, or at most 90 mg/L, or at most 95 mg/L, or at most 100 mg/L. In some embodiments, the controller 100 includes programming to maintain a dose of flocculants within a concentration range bounded by any of the foregoing concentrations (e.g., 5-100 mg/L).

In some embodiments, the controller 100 includes programming to maintain a dose of coagulants in the CEPT system 26. In some embodiments, the dose of coagulants in the CEPT system 26 ranges from 0.1 mg/L to 100 mg/L. In some embodiments, the controller 100 includes programming to maintain a dose of coagulants in the CEPT system 26 to be at least 5 mg/L, at least 10 mg/L, at least 15 mg/L, at least 20 mg/L, at least 25 mg/L, at least 30 mg/L, or at least 35 mg/L, or at least 40 mg/L. In some embodiments, the controller 100 includes programming to maintain a dose of coagulants to be at most at most 45 mg/L, or at most 50 mg/L, or at most 55 mg/L, or at most 60 mg/L, or at most 65 mg/L, or at most 70 mg/L, or at most 75 mg/L, or at most 80 mg/L, or at most 85 mg/L, or at most 90 mg/L, or at most 95 mg/L, or at most 100 mg/L. In some embodiments, the controller 100 includes programming to maintain a dose of coagulants within a concentration range bounded by any of the foregoing concentrations (e.g., 5-100 mg/L).

In some embodiments, the controller 100 includes programming to maintain a dose of polyelectrolytes in the CEPT system 26. In some embodiments, the dose of polyelectrolytes in the CEPT system 26 ranges from 0.1 mg/L to 1.5 mg/L. In some embodiments, the controller 100 includes programming to maintain a dose of polyelectrolytes in the CEPT system 26 to be at least 0.1 mg/L, at least 0.2 mg/L, at least 0.3 mg/L, at least 0.4 mg/L, at least 0.5 mg/L, at least 0.6 mg/L, or at least 0.7 mg/L, or at least 0.75 mg/L. In some embodiments, the controller 100 includes programming to maintain a dose of polyelectrolytes to be at most 0.8 mg/L, or at most 0.9 mg/L, or at most 1 mg/L, or at most 1.1 mg/L, or at most 1.2 mg/L, or at most 1.3 mg/L, or at most 1.4 mg/L, or at most 1.5 mg/L. In some embodiments, the controller 100 includes programming to maintain a dose of polyelectrolytes within a concentration range bounded by any of the foregoing concentrations (e.g., 0.1-1.5 mg/L).

In some embodiments, the controller 100 includes programming to regulate the pH of the fluid within the CEPT system 26 and/or the oxidation treatment system 44. The controller may regulate the pH of the CEPT system 26 and/or the oxidation treatment system 44 to range from 6 to 12. In some embodiments, the pH is at least 6, or at least 7, or at least 8, to less than 9, or less than 10, or less than 11, or less than 12. The pH of the CEPT system 26 may be regulated by the addition of acids or bases (e.g., NaOH, HCl, buffers, etc.) to maintain the desired pH.

The controller 100 may include programming to regulate the ozone application rate (OAR) through the oxidation treatment system 44. In some embodiments, the controller 100 includes programming to regulate the OAR at a rate from 2 mg $O_3$/L-min to 200 mg $O_3$/L-min, 2 mg $O_3$/L-min to 50 mg $O_3$/L-min, or 3 mg $O_3$/L-min to 10 mg $O_3$/L-min. In some embodiments, the controller 100 includes programming to regulate the OAR through the oxidation treatment system 44 to be at least 2 mg $O_3$/L-min, or at least 10 mg $O_3$/L-min, or at least 20 mg $O_3$/L-min, or at least 30 mg $O_3$/L-min, or at least 40 mg $O_3$/L-min, or at least 45 mg $O_3$/L-min, or at least 50 mg $O_3$/L-min, or at least 55 mg $O_3$/L-min, or at least 60 mg $O_3$/L-min, or at least 65 mg $O_3$/L-min, or at least 70 mg $O_3$/L-min, or at least 80 mg $O_3$/L-min, or at least 90 mg $O_3$/L-min, or at least mg 100 $O_3$/L-min. In some embodiments, the controller 100 includes programming to regulate the OAR through the oxidation treatment system 44 to be at most 110 mg $O_3$/L-min, or at most mg 120 $O_3$/L-min, or at most mg 130 $O_3$/L-min, or at most 140 mg $O_3$/L-min, or at most 150 mg $O_3$/L-min, or at most 160 mg $O_3$/L-min, or at most 170 mg $O_3$/L-min, or at most mg 180 $O_3$/L-min, or at most mg 190 $O_3$/L-min, or at most 200 mg $O_3$/L-min. In some embodiments, the controller 100 includes programming to maintain an OAR within a range bounded by any of the foregoing values (e.g., 10-200 mg $O_3$/L-min).

In some embodiments, the controller 100 may include programming to regulate the applied dose of ozone. For example, the controller 100 may regulate the applied dose of ozone to be from 110 to 280 mg $O_3$/L water. In some embodiments, the applied dose of ozone is at least 110 mg $O_3$/L water, or at least 130 mg $O_3$/L water, or at least 150 mg $O_3$/L water, or at least 170 mg $O_3$/L water, or at least 190 mg $O_3$/L water, to less than 210 mg $O_3$/L water, or less than 230 mg $O_3$/L water, or less than 250, or less than 270 mg $O_3$/L water, or less than 280 mg $O_3$/L water.

In some embodiments, the ozone may be delivered to the oxidation treatment system via diffusion or injection (e.g., via venturi).

The controller 100 may include programming to regulate the temperature of the oxidation treatment system 44. For example, the controller 100 includes programming to communicate with a heat exchanger (not shown) to maintain a temperature from 19° C. to 36° C. In some embodiments, the controller 100 includes programming to maintain a temperature of at least 19° C., or at least 25° C., to less than 30° C., to less than 36° C.

The controller 100 may include programming to regulate the flowrate of primary treatment fluid through the oxidation treatment system 44 to maintain a detention time. As used herein, the term "detention time" may refer to an average time for a given amount of fluid to pass through a process unit at a given rate of flow, or may refer to the time to fill a process unit at a given rate of flow. In some embodiments, the controller 100 regulates the flowrate of the primary treated fluid to maintain a detention time in the oxidation treatment system 44 that ranges from 1 minute to 90 minutes. In some embodiments, the detention time in the oxidation treatment system 44 is less than 90 minutes, or less than 80 minutes, or less than 70 minutes, or less than 60 minutes, or less than 50 minutes, or less than 40 minutes, or less than 30 minutes, or less than 20 minutes, or less than 15 minutes, or less than 10 minutes (or within a detention range bounded by any of these values, e.g., 10-40 minutes).

In some embodiments, the controller 100 may regulate the flowrate of the primary treatment fluid through the oxidation treatment system 44 to range from 2.3 gallons per minute (gpm) to 8 gpm. In some embodiments, the flowrate of the primary treatment fluid is at least 2.3 gpm, or at least 3 gpm, or at least 4 gpm, or at least 5 gpm, to less than 6 gpm, to less than 7 gpm, or to less than 8 gpm. The flowrate may be adjusted based on the size of the apparatus 10.

In some non-limiting example applications, the total volume of the oxidation treatment system 44 may range from 1 liter to 1000 liters. In some embodiments, the total volume of the oxidation treatment system 44 may be at least 1 liter, or at least 50 liters, or at least 100 liters, or at least 150 liters, or at least 200 liters, or at least 250 liters, or at least 300 liters, or at least 350 liters, to less than 400 liters, or less than 500 liters, or less than 750 liters, or less than 1000 liters.

The controller may regulate the OAR of ozone through the oxidation treatment system 44. In some embodiments, the controller 100 regulates the OAR of ozone through the oxidation treatment system 44 such that an effective amount of ozone contacts the primary treated fluid to generate the secondary treatment fluid having a chemical oxygen demand (COD) removal level greater than 85%. In some embodiments, the secondary treatment fluid has a chemical oxygen demand (COD) removal level of at least 86%, or at least 87%, or at least 88%, or at least 89%, or at least 90%, or more (or within a range bounded by any of these values, e.g., 85%-90%). In some embodiments, the secondary treatment fluid has a COD removal level of at least 90% with a detention time of less than 30 minutes. In some embodiments, the secondary treatment fluid has a COD removal level of at least 90% with a detention time of less than 30 minutes and with an OAR that ranges between 90 to 120 mg $O_3$/L-min. In some embodiments, COD removal may be achieved in less than 30 minutes, in less than 20 minutes, or in less than 10 minutes of treatment.

In some embodiments, the controller 100 regulates the OAR of ozone through the oxidation treatment system 44 such that an effective amount of ozone contracts the primary treated fluid to generate the secondary treatment fluid having a chemical oxygen demand (COD) that is less than 30 mg/L. In some embodiments, the COD is less than 30 mg/L, or less than 25 mg/L, or less than 20 mg/L, or less than 15 mg/L.

In some embodiments, the controller 100 regulates the OAR of ozone through the oxidation treatment system 44 such that an effective amount of ozone contacts the primary treated fluid to generate the secondary treatment fluid having a biochemical oxygen demand (BOD) removal level greater than 85%. In some embodiments, the secondary treatment fluid has a biochemical oxygen demand (BOD) removal level of at least 86%, or at least 87%, or at least 88%, or at least 89%, or at least 90%, or more. In some embodiments, the secondary treatment fluid has a BOD removal level of at least 90% with a detention time of less than 30 minutes. In some embodiments, the secondary treatment fluid has a BOD removal level of at least 90% with a detention time of less than 30 minutes and with an OAR that ranges between 90 to 120 mg $O_3$/L-min.

In some embodiments, the controller 100 regulates the OAR of ozone through the oxidation treatment system 44 such that an effective amount of ozone contracts the primary treated fluid to generate the secondary treatment fluid having a biochemical oxygen demand (BOD) that is less than 15 mg/L. In some embodiments, the BOD is less than 15 mg/L, or less than 14 mg/L, or less than 13 mg/L, or less than 12 mg/L, or less than 11 mg/L, or less than 10 mg/L.

In some embodiments, the controller 100 regulates the OAR of ozone through the oxidation treatment system 44 such that an effective amount of ozone contacts the primary treated fluid to generate the secondary treatment fluid having a total suspended solids (TSS) removal of 95% or more. In some embodiments, the secondary treatment fluid has a TSS removal of at least 95%, or at least 96%, or at least 97%, or at least 98%, or at least 99%, or more. In some embodiments, the secondary treatment fluid is free of suspended solids (e.g., non-detectable). In some embodiments, the secondary treatment fluid has a TSS removal level of at least 99% with a detention time of less than 30 minutes. In some embodiments, the secondary treatment fluid has a TSS removal level of at least 99% with a detention time of less than 30 minutes and with an OAR that ranges between 90 to 120 mg $O_3$/L-min.

In some embodiments, the controller 100 regulates the OAR of ozone through the oxidation treatment system 44 such that an effective amount of ozone contacts the primary treated fluid to generate the secondary treatment fluid having a turbidity removal of 95% or more. In some embodiments, the secondary treatment fluid has a turbidity removal level of at least 96%, or at least 97%, or at least 98%, or at least 99%, or more. In some embodiments, the secondary treatment fluid has less than 5 nephelometric turbidity units (NTUs), or has less than 4 NTUs, or less than 3 NTUs, or less than 2 NTUs, or less than 1 NTUs. In some embodiments, the secondary treatment fluid has a turbidity removal level of at least 95% with a detention time of less than 30 minutes. In some embodiments, the secondary treatment fluid has a turbidity removal level of at least 95% with a detention time of less than 30 minutes and with an OAR that ranges between 90 to 120 mg $O_3$/L-min.

In some embodiments, the controller 100 regulates the OAR of ozone through the oxidation treatment system 44 such that an effective amount of ozone contacts the primary treated fluid to generate the secondary treatment fluid having an *E. coli* removal of 90%, 95%, 99% or more (as measured by CFU/ml). In some embodiments, the secondary treatment fluid has an *E. coli* removal level of at least 99%, or at least 99.5%, or at least 99.9%, or at least 99.99%, or at least 99.999%, or more (as measured by CFU/ml). In some embodiments, the secondary treatment fluid has an *E. coli* removal level of at least 99.999% with a detention time of less than 30 minutes. In some embodiments, the secondary treatment fluid has a turbidity removal level of at least 99.999% with a detention time of less than 30 minutes and with an OAR that ranges between 90 to 120 mg $O_3$/L-min.

In some embodiments, *E. coli* removal may be achieved in less than 30 minutes, in less than 20 minutes, or in less than 10 minutes of treatment.

In some embodiments, the present disclosure provides a method of treating a wastewater fluid stream, such as a CSO or a SSO. The method includes feeding an untreated fluid to a primary treatment system 26 in order to remove solids from the untreated fluid to generate a primary treated fluid. The method further includes oxidizing the primary treated fluid in an oxidation treatment system 44 having an inlet configured to receive the primary treated fluid, an ozone inlet configured to receive ozone from an ozone generator, and an outlet configured to dispense secondary treated fluid. The primary treatment system 26 may include porous filtration media, a CEPT system, or a combination thereof, as described in reference to FIGS. 1-2.

In some embodiments, the provided method may include dosing the CEPT system 26 with one or more of a flocculant, a coagulant, a polyelectrolyte, and combinations thereof, to enhance separation of solids from the untreated fluid. The method may include regulating a flow of flocculant to the CEPT system 26 to maintain a concentration from 0.1 mg/L to 100 mg/L. In some embodiments, the method includes regulating a flow of the flocculant to the CEPT system to maintain a concentration of flocculant that is at least 5 mg/L, at least 10 mg/L, at least 15 mg/L, at least 20 mg/L, at least 25 mg/L, at least 30 mg/L, or at least 35 mg/L, or at least 40 mg/L. In some embodiments, the method may include regulating a flow of flocculant to the CEPT system 26 to maintain a concentration of at most 45 mg/L, or at most 50 mg/L, or at most 55 mg/L, or at most 60 mg/L, or at most 65 mg/L, or at most 70 mg/L, or at most 75 mg/L, or at most 80 mg/L, or at most 85 mg/L, or at most 90 mg/L, or at most 95 mg/L, or at most 100 mg/L. In some embodiments, the method includes maintaining a concentration of flocculants within a concentration range bounded by any of the foregoing concentrations (e.g., 5-100 mg/L).

In some embodiments, the method may include regulating the flow of the coagulant to the CEPT system 26 to maintain a concentration from 0.1 mg/L to 100 mg/L. In some embodiments, the method includes regulating the flow of the coagulant to maintain a concentration of at least 5 mg/L, at least 10 mg/L, at least 15 mg/L, at least 20 mg/L, at least 25 mg/L, at least 30 mg/L, or at least 35 mg/L, or at least 40 mg/L. In some embodiments, the method includes regulating the flow of the coagulant to maintain a concentration of at most 45 mg/L, or at most 50 mg/L, or at most 55 mg/L, or at most 60 mg/L, or at most 65 mg/L, or at most 70 mg/L, or at most 75 mg/L, or at most 80 mg/L, or at most 85 mg/L, or at most 90 mg/L, or at most 95 mg/L, or at most 100 mg/L. In some embodiments, the method includes maintaining a concentration of coagulants within a concentration range bounded by any of the foregoing concentrations (e.g., 5-100 mg/L).

In some embodiments, the method may include regulating the flow of polyelectrolytes to the CEPT system 26. In some embodiments, the method includes regulating the flow of the polyelectrolyte to maintain a concentration from 0.1 mg/L to 1.5 mg/L. In some embodiments, the method includes regulating the flow of polyelectrolyte to maintain a concentration of at least 0.1 mg/L, at least 0.2 mg/L, at least 0.3 mg/L, at least 0.4 mg/L, at least 0.5 mg/L, at least 0.6 mg/L, or at least 0.7 mg/L, or at least 0.75 mg/L. In some embodiments, the method includes regulating the flow of polyelectrolyte to maintain a concentration of at most 0.8 mg/L, or at most 0.9 mg/L, or at most 1 mg/L, or at most 1.1 mg/L, or at most 1.2 mg/L, or at most 1.3 mg/L, or at most 1.4 mg/L, or at most 1.5 mg/L. In some embodiments, the method includes maintaining a concentration of polyelectrolyte within a concentration range bounded by any of the foregoing concentrations (e.g., 0.1-1.5 mg/L).

In some embodiments, the pH of the fluid within the CEPT system 26 and/or the oxidation treatment system 44 is maintained at a pH between 6 and 12. The method includes controlling the pH by adding an acid, base, buffer, or a combination thereof to maintain a desired set point. In some embodiments, the method includes regulating the flow of the acid, base, buffer, or a combination thereof to maintain a pH of at least 6, or at least 7, or at least 8, to less than 9, or less than 10, or less than 11, or less than 12.

In some embodiments, the method includes regulating the ozone application rate (OAR) through the oxidation treatment system 44. In some embodiments, the method includes regulating the OAR from 2 mg $O_3$/L-min to 200 mg $O_3$/L-min, 2 mg $O_3$/L-min to 50 mg $O_3$/L-min, or 3 mg $O_3$/L-min to 10 mg $O_3$/L-min. In some embodiments, the method includes regulating the OAR through the oxidation treatment system 44 to be at least 2 mg $O_3$/L-min, or at least 10 mg $O_3$/L-min, or at least 20 mg $O_3$/L-min, or at least 30 mg $O_3$/L-min, or at least 40 mg $O_3$/L-min, or at least 45 mg $O_3$/L-min, or at least 50 mg $O_3$/L-min, or at least 55 mg $O_3$/L-min, or at least 60 mg $O_3$/L-min, or at least 65 mg $O_3$/L-min, or at least 70 mg $O_3$/L-min, or at least 80 mg $O_3$/L-min, or at least 90 mg $O_3$/L-min, or at least mg 100 $O_3$/L-min.

In some embodiments, the method includes regulating the applied dose of ozone to the oxidation treatment system 44. In some embodiments, the method includes regulating the applied dose of ozone to be from 110 to 280 mg $O_3$/L water. In some embodiments, the method includes regulating the applied dose to be at least 110 mg $O_3$/L water, or at least 130 mg $O_3$/L water, or at least 150 mg $O_3$/L water, or at least 170 mg $O_3$/L water, or at least 190 mg $O_3$/L water, to less than 210 mg $O_3$/L water, or less than 230 mg $O_3$/L water, or less than 250, or less than 270 mg $O_3$/L water, or less than 280 mg $O_3$/L water.

In some embodiments, the method includes regulating the temperature of the oxidation treatment system 44. The temperature may be regulated using a heat exchanger. For example, the method may include maintain a temperature in the oxidation treatment system 44 at a temperature from 19° C. to 36° C. In some embodiments, method includes maintaining a temperature of at least 19° C., or at least 25° C., to less than 30° C., to less than 36° C.

In some embodiments, the method includes regulating the flowrate of the primary treatment fluid through the oxidation treatment system 44 to maintain a detention time. The method includes regulating the flowrate of the primary treatment fluid to maintain a detention time from 1 minute to 90 minutes. In some embodiments, the method includes regulating the detention time in the oxidation treatment system 44 to be less than 90 minutes, or less than 80 minutes, or less than 70 minutes, or less than 60 minutes, or less than 50 minutes, or less than 40 minutes, or less than 30 minutes, or less than 20 minutes, or less than 15 minutes, or less than 10 minutes (or within a detention range bounded by any of these values, e.g., 10-40 minutes).

In some embodiments, the method includes regulating the flow rate of the primary treatment fluid through the oxidation treatment system 44 to range from 2.3 gallons per minute (gpm) to 8 gpm. In some embodiments, method includes regulating the flowrate of the primary treatment fluid to be at least 2.3 gpm, or at least 3 gpm, or at least 4 gpm, or at least 5 gpm, to less than 6 gpm, to less than 7 gpm, or to less than 8 gpm. The flowrate may be adjusted based on the size of the apparatus 10.

In some embodiments, the method includes regulating the OAR of ozone though the oxidation treatment system 44 such that an effective amount of ozone contacts the primary treated fluid to generate the secondary treatment fluid having a chemical oxygen demand (COD) removal level greater than 85%. In some embodiments, the method includes regulating the OAR of ozone through the secondary treatment fluid such that a chemical oxygen demand (COD) removal level of at least 86%, or at least 87%, or at least 88%, or at least 89%, or at least 90%, or more (or within a range bounded by any of these values, e.g., 85%-90%) is achieved. In some embodiments, the method includes regulating the OAR of ozone through the oxidation treatment system 44 such that a COD removal level of at least 90% is achieved within a detention time of less than 30 minutes, in less than 20 minutes, or in less than 10 minutes of treatment.

In some embodiments, the method includes regulating the OAR of ozone through the oxidation treatment system 44 such that an effective amount of ozone contracts the primary treated fluid to generate the secondary treatment fluid having a chemical oxygen demand (COD) that is less than 30 mg/L. In some embodiments, the COD is less than 30 mg/L, or less than 25 mg/L, or less than 20 mg/L, or less than 15 mg/L.

In some embodiments, the method includes regulating the OAR of ozone through the oxidation treatment system 44 such that an effective amount of ozone contacts the primary treated fluid to generate the secondary treatment fluid having a biochemical oxygen demand (BOD) removal level greater than 85%. In some embodiments, the secondary treatment fluid has a biochemical oxygen demand (BOD) removal level of at least 86%, or at least 87%, or at least 88%, or at least 89%, or at least 90%, or more. In some embodiments, the secondary treatment fluid has a BOD removal level of at least 90% with a detention time of less than 30 minutes. In some embodiments, the secondary treatment fluid has a BOD removal level of at least 90% with a detention time of less than 30 minutes, or less than 20 minutes, or less than 10 minutes.

In some embodiments, the method includes regulating the OAR of ozone through the oxidation treatment system 44 such that such that an effective amount of ozone contracts the primary treated fluid to generate the secondary treatment fluid having a biochemical oxygen demand (BOD) that is less than 15 mg/L. In some embodiments, the BOD is less than 15 mg/L, or less than 14 mg/L, or less than 13 mg/L, or less than 12 mg/L, or less than 11 mg/L, or less than 10 mg/L.

In some embodiments, the method includes regulating the OAR of ozone through the oxidation treatment system 44 such that an effective amount of ozone contacts the primary treated fluid to generate the secondary treatment fluid having a total suspended solids (TSS) removal of 95% or more. In some embodiments, the secondary treatment fluid has a TSS removal of at least 95%, or at least 96%, or at least 97%, or at least 98%, or at least 99%, or more. In some embodiments, the secondary treatment fluid is free of suspended solids (e.g., non-detectable). In some embodiments, the secondary treatment fluid has a TSS removal level of at least 99% with a detention time of less than 30 minutes. In some embodiments, the secondary treatment fluid has a TSS removal level of at least 99% with a detention time of less than 30 minutes, or less than 20 minutes, or less than 10 minutes.

In some embodiments, the method includes regulating the OAR of ozone through the oxidation treatment system 44 such that an effective amount of ozone contacts the primary treated fluid to generate the secondary treatment fluid having a turbidity removal of 95% or more. In some embodiments, the secondary treatment fluid has a turbidity removal level of at least 96%, or at least 97%, or at least 98%, or at least 99%, or more. In some embodiments, the secondary treatment fluid has less than 5 nephelometric turbidity units (NTUs), or has less than 4 NTUs, or less than 3 NTUs, or less than 2 NTUs, or less than 1 NTUs. In some embodiments, the secondary treatment fluid has a turbidity removal level of at least 95% with a detention time of less than 30 minutes. In some embodiments, the secondary treatment fluid has a turbidity removal level of at least 95% with a detention time of less than 30 minutes, or less than 20 minutes, or less than 10 minutes.

In some embodiments, the method includes regulating the OAR of ozone through the oxidation treatment system 44 such that an effective amount of ozone contacts the primary treated fluid to generate the secondary treatment fluid having an *E. coli* removal of 90%, 95%, 99% or more (as measured by CFU/ml). In some embodiments, the secondary treatment fluid has an *E. coli* removal level of at least 99%, or at least 99.5%, or at least 99.9%, or at least 99.99%, or at least 99.999%, or more (as measured by CFU/ml). In some embodiments, the secondary treatment fluid has an *E. coli* removal level of at least 99.999% with a detention time of less than 30 minutes. In some embodiments, the secondary treatment fluid has a turbidity removal level of at least 99.999% with a detention time of less than 30 minutes, less than 20 minutes, or less than 10 minutes.

EXAMPLES

The following examples illustrate some embodiments and aspects of the disclosure. It will be apparent to those skilled in the art that various modifications, additions, substitutions, and the like can be performed without altering the spirit or scope of the disclosure, and such modifications and variations are encompassed within the scope of the disclosure as defined in the claims which follow. The following examples do not in any way limit the disclosure.

Example 1

Example 1—Materials

Synthetic SSO Water:

Synthetic SSO water used in batch testing. Briefly, inert and organic solids were added to distilled water to represent oxygen-demanding particulate organics and total solids. Various other constituents were also included in concentrations representative of diluted wastewater. *E. coli* was added as the representative bacterium for inactivation studies. Similarly, triclosan (TCS) and triclocarban (TCC) were added to the synthetic SSO as representative hydrophobic micropollutants.

*E. coli* Stock Solution:

*E. coli* 15597 stock solutions were prepared using the overnight culture method. Difco™ modified tryptic soy broth (TSB) (Becton, Dickinson and Company, Sparks, MD) was prepared and autoclaved for use during overnight culture and log phase preparation. A frozen aliquot of *E. coli* was thawed at 37° C., added to an aliquot of TSB in a sterile centrifuge, and incubated at 37° C. overnight. Log phase cultures were prepared by adding an aliquot of the incubated overnight stock to an aliquot of TSB in a sterile centrifuge (aliquot volumes based on *E. coli* concentration requirements) and placing the centrifuge on a shaker table for approximately 3 h. Prior to plating and enumeration, 1:10 sample-to-phosphate-buffer-solution dilutions were made. The *E. coli* concentration was enumerated using the membrane filtration method (APHA et al., 2012) with Difco™ m Endo Broth MF™ (Becton, Dickinson and Company, Sparks, MD). Example 1—Test Methods and Calculations Standard methods were used to determine synthetic SSO, CEPT supernatant, and AOP effluent concentrations of $BOD_5$, COD, ammonia-nitrogen ($NH_3$—N), organic nitrogen ($N_{org}$), total Kjeldahl nitrogen (TKN), total phosphorus (TP), total suspended solids (TSS), volatile suspended solids (VSS), *E. coli*, and metals concentrations (APHA et al., 2012).

Chemical oxygen demand (COD) removal is a measure of organic pollutant removal. As used herein, COD removal may be measured by standard methods such as those disclosed in (APHA et al., 2012).

Biochemical oxygen demand (BOD) removal is a measure of biodegradable organic pollutant removal. As used herein, BOD may be measured by standard methods (APHA et al., 2012).

Total suspended solids (TSS) is a measure of solid particle removal. As used herein, TSS may be measured by standard methods (APHA et al., 2012).

Turbidity removal is a measure of solid particle removal. As used herein, turbidity removal may be measured by standard methods (APHA et al., 2012).

*E. coli* removal is a measure of pathogen indicator organism inactivation. As used herein, *E. coli* removal may be measured by standard methods (APHA et al., 2012).

Low aqueous ozone concentrations were measured using a commercial test kit with a range up to 1.5 mg/L $O_3$ (AccuVac ampules, HACH, Loveland, CO). Higher concentrations of aqueous ozone were measured using the Indigo Method (Bader & Hoigné, 1981; APHA et al., 2012). Aqueous ozone residual in treated effluent samples analyzed for *E. coli* was quenched by adding sodium thiosulfate to the sample to stop any further reaction that may affect *E. coli* concentration (Xu et al., 2002; Gehr et al., 2003).

Gaseous ozone concentration in the ozone-enriched oxygen and in the ozone contactor off gas was measured using a UV analyzer (model 106-H, 2B Technologies, Boulder, CO). The iodometric method (potassium iodide, KI) was used to validate the UV analyzer readings for ozone gas concentrations by trapping ozone in a KI solution (Rakness et al., 1996; Gehr et al., 2003). Ozone analyzer results were within 3% of results from KI solution analysis. Therefore, the UV analyzer results were verified.

Microsoft Excel (Microsoft Corporation, Redmond, WA) was used to conduct Student t tests to demonstrate significance among various treatments or chemical doses. Significance differences were assumed when p-value was less than or equal to 0.05.

Integral Method to Determine Kinetic Expression:

The Integral Method described by Levenspiel (1999) was applied to the chemical oxygen demand (COD) removal over time data to identify a kinetic model (i.e., zero order, first order, second order) that accurately predicted the observed batch results. Linearized plots of COD concentration versus time for zero, first, and second order models as well as the Eckenfelder-Grau kinetic model were made. The steady-state, complete-mix stirred tank reactor (CSTR) integrated Eckenfelder-Grau kinetic expression for reduction of a gross parameter (e.g., COD) composed of a mixed substrate is as follows (Grau et al., 1975; Eckenfelder et al., 2009):

$$\frac{C_0 - C_t}{V/Q} = k \frac{C}{C_0} \qquad \text{(Equation 1)}$$

Where k is the reaction rate constant (min-1), Co is the initial COD concentration (mg/L), Ct is COD concentration (mg/L) at time t, V is treatment volume (L), and Q is the flowrate (L/min).

The reaction rate constant determined for each kinetic model was then used to determine predicted COD concentrations at different times. Measured and predicted COD concentrations were then compared using the sum of the square of the error (SSE) for each reaction order model. The kinetic model resulting in the smallest SSE value was then identified.

Correlation (determined by $R^2$) with the modeled exponential trendline was also taken into account to determine the goodness of fit for each kinetic model. The constants (k values) for each kinetic model were determined by plotting the linearized kinetic expression to determine the k value using the data shown in Table 3.

The nth Order Method to Determine Kinetic Expression:

COD removal batch reactor data were also analyzed using the empirical rate equation of nth order approach described by Levenspiel (1999). Briefly, a reaction order (n) between zero and 2, but excluding 1, was assumed and the rate equation (Equation 2) was integrated and evaluated in Microsoft Excel Solver to calculate predicted COD concentration (Cm, mg/L) by varying n and k using trial-and-error to determine the k resulting in the best fit to the observed data:

$$\frac{dC}{dt} = -kC^n \qquad \text{(Equation 2)}$$

Where C is COD concentration at time t (mg/L), t is treatment time (min), n is the reaction order (unitless), and k is the reaction rate constant (units vary depending on order employed). Values of n and k that resulted in the smallest SSE value were identified by comparing predicted and observed COD concentrations.

Example 1—Exemplary Apparatus and Methods

Exemplary Chemically Enhanced Primary Treatment (CEPT) Batch Apparatus:

A gang mixer was used for batch CEPT testing. The gang mixer had six, square, 2-L beakers each stirred with a speed-controlled, flat paddle (Jar Tester, Phipps and Bird, Richmond, VA). Ferric chloride ($FeCl_3$) (VWR International, Radnor, PA) and an anionic polymer flocculant aid (Praestol A4060, Solenis, Wilmington, DE) were added at 80 mg/L and 0.8 mg/L, respectively, to synthetic SSO waters.

These doses resulted in 95% turbidity removal. Ferric chloride was added to the beaker containing one liter of synthetic SSO before mixing began. The gang mixer was then operated at rapid mix (100 rpm) for one min, with the polymer added 30 sec after rapid mix commenced. After rapid mix, flocculation (30 rpm) occurred for two min followed by a settling time of two min with no mixing. Supernatant from the jar test beakers was applied to the AOP process to simulate sequential CEPT/AOP treatment.

Exemplary Advanced Oxidation Process (AOP) batch apparatus:

A 2-L graduated cylinder was used as a batch ozone contactor (Lopez-Lopez et al., 2007; Quero-Pastor et al., 2014). The same cylinder was used for trials with and without slag or glass marble packing. To create the slag-packed column, the 2-L graduated cylinder was filled with 1.8 L bulk volume (including voids) of slag.

This resulted in a water volume of 1.2 L. For trials with slag or glass marble packing, water was recirculated from the bottom of the reactor to the top at a rate of 0.15 L/min using a peristaltic pump. For trials without slag or glass marble packing, a magnetic stir bar and stir plate were used to increase mixing within the graduated cylinder which held 1.2 L water.

Ozone was generated for batch testing using a corona discharge ozone generator (LAB2B, Ozonia, Leonia, NJ). The ozone generator produced 6 to 8 g $O_3$/h using pure oxygen as the feed gas with a total gas flow rate of 2.5 to 5 L/min. The oxygen was fed at 10 psi as recommended by the ozone generator manufacturer. Using these operating conditions, ozone application rates (OAR) were 68 to 90 mg $O_3$/L-min over the duration of the tests (30-90 min ozone contact time).

Exemplary Performance Data of the Individual CEPT and AOP Systems:

Synthetic SSO water and water pumped from the Milwaukee Metropolitan Sewerage District (MMSD) deep tunnel system following a storm event on Mar. 31, 2017 are presented in Table 1.

TABLE 1

Untreated Synthetic SSO Water and Deep Tunnel Water Characterization

| Parameter | Synthetic SSO Water (n = 3) | Deep Tunnel Water (3/31/17) (n = 2) |
|---|---|---|
| COD (mg/L) | 350 ± 12 | 48 ± 13 |
| BOD (mg/L) | 160 ± 49 | 30 ± 8.1 |
| TSS (mg/L) | 124 ± 37 | 62 ± 19 |
| VSS (mg/L) | 116 ± 34 | 31 ± 16 |
| E. coli log (CFU/100 mL) | $10^6$ | $10^7$ |
| TP (mg/L) | 3.1 ± 0.2 | 3.0 ± 2.7 |
| $NH_3$—N (mg/L) | 12 ± 2.2 | 1.7 ± 0.2 |

The deep tunnel system is a storm water storage and conveyance system implemented to reduce the occurrence of CSOs and SSOs by storing wet weather flows until treatment plants can treat the water. Considering the purpose of the deep tunnel, it contains a mixture of water similar to that of CSOs and SSOs with characteristics based, in part, on the sewer management decisions made during the storm event.

The contaminant removal results from CEPT supernatant are shown in Table 2.

TABLE 2

Batch CEPT Contaminant Removals (n = 3)

| Parameter | Synthetic SSO Water (Influent) | Post-CEPT Value (Supernatant) | Average % Removal in CEPT |
|---|---|---|---|
| COD (mg/L) | 543 ± 38 | 288 ± 42 | 47 |
| $BOD_5$ (mg/L) | 195 ± 40 | 114 ± 0.4 | 42 |
| E. coli log (CFU/100 mL) | $10^6$ | $10^5$ | 90 |
| TSS (mg/L) | 251 ± 27 | 25 ± 1.9 | 90 |
| VSS (mg/L) | 242 ± 2.9 | 17 ± 1.3 | 93 |
| TP (mg/L) | 3.9 ± 1.2 | 1.2 ± 0.6 | 70 |

TABLE 2-continued

Batch CEPT Contaminant Removals (n = 3)

| Parameter | Synthetic SSO Water (Influent) | Post-CEPT Value (Supernatant) | Average % Removal in CEPT |
|---|---|---|---|
| $NH_3$—N (mg/L) | 19 ± 1.0 | 17 ± 0.7 | 9 |
| Organic N (mg/L) | 15 ± 3.3 | 11 ± 2.1 | 25 |
| TKN (mg/L) | 34 ± 3.5 | 28 ± 1.9 | 16 |

Increased TSS removal improved subsequent AOP treatment efficiency, reducing both the require detention time and overall system cost. Effective solids removal included particulate COD and $BOD_5$ removal, as well as removal of other contaminants that sorb to solids such as E. coli and metals. Ferric chloride addition resulted in partial removal of soluble phosphate.

Ozone mass transfer may be impacted by ozone production rate, contactor design, gas flow rate, and temperature, among others. The ozone production rate (OPR) in this Example was tested in a range of 6.5 to 8.2 $O_3$/hr. An OPR in the range of 6.5 to 8.2 resulted in more rapid ozone transferred from gas to the aqueous phase in the ozone contactor, reducing the time to achieve 90% COD removal across the CEPT-AOP system from approximately 400 min (e.g., when using ~2 g $O_3$/hr) to less than 30 min (FIG. 3).

Figure 3:
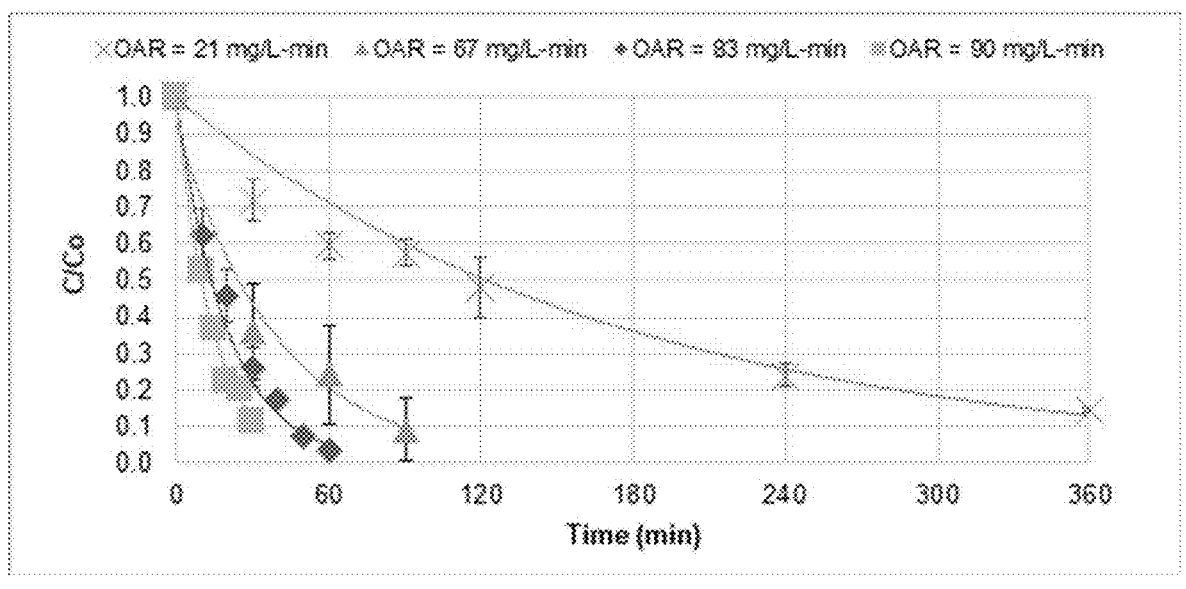
FIG. 3 is a graph illustrating first order chemical oxygen demand (COD removal with ozonation showing an increase in ozone application rate (OAR) resulting in faster reaction rate. Curves are fitted to data assuming pseudo-first order reactions. The y-intercept was set through $C/C_0=1$. $n=3$ for all sets of data. Error bars represent standard deviation. Some error bars are small and not visible.

Correspondingly, the pseudo-first order COD removal reaction rate constant increased by over an order of magnitude from 0.005+0.0002 min-1 to 0.076+0.03 min-1 (p=1.7E-5) (FIG. 3 and Table 3).

TABLE 3

First Order Reaction Rate Constants

| OAR (mg $O_3$/L-min) | $[O_3]_g$ in ozonated oxygen gas flow (mg $O_3$/L gas) | First Order Rate Constant, k (min$^{-1}$) (n = 3) | Treatment Time (min) | Average Final [COD] (mg/L) |
|---|---|---|---|---|
| 21 | 8.0 | −0.005 ± 0.0002 | 400 | 51 |
| 67 | 33 | −0.04 ± 0.01 | 90 | 30 |
| 83 | 20 | −0.05 ± 0.01 | 60 | 12 |
| 90 | 33 | −0.08 ± 0.03 | 30 | 22 |

COD removal with different ozone contactor volumes, ozonated oxygen flowrates, and ozone contact times are shown in FIG. 3. Each change resulted in a different OAR and transferred ozone dose (TOD), which ultimately affected the detention time needed to achieve 90% COD removal. Changing the flowrate of ozonated oxygen changed the TOD by affecting both the ozone mass transfer rate and ozone concentration in the gas fed to the ozone contactor and, therefore, the saturation concentration values in the water. Lower ozonated oxygen flowrates resulted in higher gas phase ozone concentrations and a corresponding, higher saturation aqueous ozone concentration, but with a corresponding lower mass transfer rate value.

Figure 4:
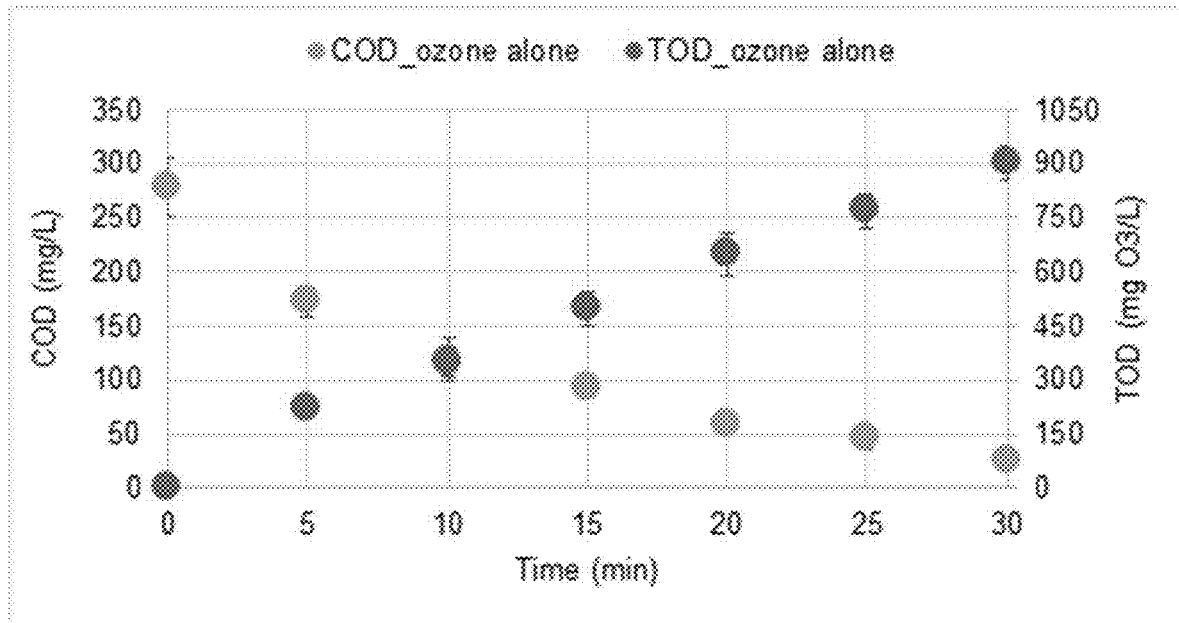
FIG. 4 is a graph illustrating pseudo-first order modeling COD removal relative to TOD throughout treatment time of 30 min (OAR=90 mg/L-min). $n=3$ for all sets. Error bars represent standard deviation. Some error bars are small and not visible.
Figure 5:
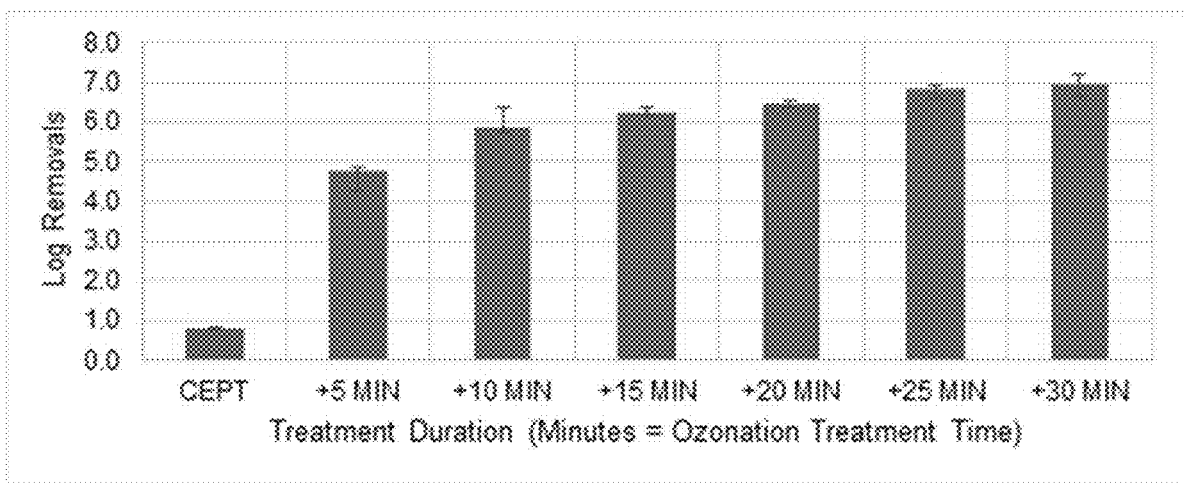
FIG. 5 is a graph of log reduction over time for *E. coli* removal with batch CEPT (sorption) and ozonation (inactivation), $n=4$.

Ozone concentration in the off gas was measured during the 30-min treatment time so an ozone mass balance could be calculated. It was assumed that the aqueous ozone residual was negligible (<1 mg $O_3$/L) due to the high reactivity of the water treated. Therefore, TOD was calculated as the difference between the produced ozone and ozone concentration in the off gas. TOD takes into account the concentration of ozone in the ozone-enriched oxygen gas, the inlet gas pressure, gas flowrate, treatment volume, and treatment time. Additionally, the average g $O_3$ transferred per g COD removed ratio was determined to be 3.0, meaning the system requires approximately 3 g $O_3$ to remove 1 g COD (FIG. 4). During each 30-min batch test, a range of values between 2-4 g $O_3$ transferred for 1 g COD removed, possibly representing different fast and slow reaction stoichiometry as ozone reacted with various constituents of the mixed substrate (COD). The average value of 3 g $O_3$ to remove 1 g COD is validated stoichiometrically by electron equivalents, and is discussed in the range of 3 g $O_3$ to remove 1 g COD (as carbon) in Karrer et al. (1997).

Integral Method to Determine Kinetic Expression:

Comparing SSE values for zero, first, and second order as well as Eckenfelder-Grau kinetic models, the first order model resulted in the smallest average SSE using the data shown in FIG. 3 and Table 4. However, the SSE values for each trial and across each model were not significantly different (p=0.1-0.8). The first order model was subsequently employed due to its simplicity and common use in the literature to describe ozone reactions with respect to COD (Beltran, 2004; Gottschalk et al., 2010; Lucas et al., 2010). The Integral Method and the exponential trendline (FIG. 3) method both resulted in similar values for $k_1$ (see Table 4, compare to Table 3).

Between the Integral and nth Order Methods to determine a kinetic expression, results using the Integral Method more accurately predicted the observed COD removal. Firstly, the SSE values were lower and secondly, the pseudo-first order kinetic model is commonly found in literature for COD removal over time. The most commonly reported n-value for ozone reactions is 1, making first order reaction coefficients more easily compared to other values in the literature.

COD and BOD removals were 90±4.3% and 82±1.3%, respectively. Nearly half of the removal was accomplished by CEPT alone, which was consistent with the hypothesis that approximately 50% of COD and BOD was particulate. A portion of the remaining soluble COD fraction was removed during ozonation, in which ozone likely directly and indirectly (through the formation of hydroxyl radicals) degraded contaminants.

Total phosphorous (TP) was removed by 87%, with 70% of that removal occurring during CEPT. Ferric chloride facilitates efficient removal of phosphorus via precipitation and solids removal. Additionally, the particulate fraction of TP in domestic wastewater is also removed at the same time TSS is removed either through physical particle removal or sorption of soluble phosphorus followed by particle removal.

TKN removal across the system was comparatively low (35%), with 65% greater organic N (71%) removal than ammonia removal (6%). No ammonia was removed during ozonation, while the majority of organic N was removed in this step. While AOPs are not highly effective at direct TP or TKN removal, the reactive hydroxyl radicals they produce are capable of converting organic P to inorganic, reactive P, making it easier to remove through physical or chemical mechanisms such as precipitation. Ozone is capable of oxidizing components of nitrogen, though at low removal rates. Additionally, the oxidization of nitrogen species can be limited by preferential ozone demand for the removal of organics. Sequentially, the recalcitrant organics will be oxidized first and remaining ozone could be used for oxidation of nitrogen components.

TABLE 4

| Batch Experiments (FIG. 1) Integral Model Analysis based on SSE Values | | | | | | | |
|---|---|---|---|---|---|---|---|
| | Eckenfelder-Grau ln ([COD]) vs. time | | Zero Order [COD] vs. time | | First Order ln([COD]) vs. time | | Second Order 1/[COD] vs. time | |
| OAR (mg $O_3$/ L-min) | Average $k_{EG}$ (mg/ L-min) | SSE | Average $k_0$ (mg/ L-min) | SSE | Average $k_1$ (min$^{-1}$) | SSE | Average $k_2$ (L/mg-min) | SSE |
| 67 | −4.8 ± 0.2 | 3.2E+04 | −4.8 ± 0.2 | 3.2E+04 | −0.05 ± 0.006 | 5.4E+03 | 0.001 ± 0.0005 | 3.6E+04 |
| 83 | −1.9 ± 0.5 | 2.4E+04 | −1.9 ± 0.5 | 2.4E+04 | −0.04 ± 0.01 | 1.3E+04 | 0.006 ± 0.005 | 2.6E+04 |

Exemplary Performance Data of the Combined CEPT-AOP System:

The 1.2-L empty column ozone contactor was used to treat CEPT supernatant to test for wastewater parameters, such as TCC, TCS, and *E. coli* removals (Table 5).

TABLE 5

| Batch CEPT-AOP System Treatment Efficiency (n = 3) | | | |
|---|---|---|---|
| Parameter | Influent Value | Effluent Value | % Removal Overall |
| COD (mg/L) | 543 ± 38 | 61 ± 23 | 90 |
| BOD (mg/L) | 195 ± 40 | 38 ± 2.6 | 82 |
| *E. coli* log (CFU/100 mL) | 10$^6$ | ND | 99.9999 |
| TSS (mg/L) | 251 ± 27 | ND | >99 |
| VSS (mg/L) | 242 ± 2.9 | ND | >99 |
| TP (mg/L) | 3.9 ± 1.2 | 0.5 ± .1 | 87 |
| NH$_3$—N (mg/L) | 19 ± 1.0 | 18 ± 1.9 | 6 |
| Organic N (mg/L) | 15 ± 3.3 | 4.3 ± 0.9 | 71 |
| TKN (mg/L) | 34 ± 3.5 | 22 ± 2.8 | 35 |

Micropollutant removal results in this study were inconclusive as the lack of control tests, including spike and recovery, made it difficult to discern the contaminant removal mechanism between sorption and oxidation.

There was no significant increase in log inactivation values after 10 min for *E. coli* inactivation with ozone and plate counts were below the limits of detection (FIG. 4). Ozone treatment efficiency is influenced by the wastewater matrix and a high percentage of solids removal is necessary to mitigate this influence.

Kinetic Analysis of *E. Coli* Inactivation During Ozonation

Ozone as a disinfectant rapidly inactives *E. coli*. For example, the coefficient of specific lethality for inactivation of *E. coli* by ozone exceeds that of chlorine ($Cl_2$) by over 4 orders of magnitude (8,330 L/mg-min compared to 3.75 L/mg-min). Kinetic analysis was therefore conducted at intervals <5 min to better capture *E. coli* inactivation rates. Sampling intervals were every 10 sec until 1 min, then every min until 10 min. However, most plate counts were below the limits of detection after 3 min.

Figure 6:
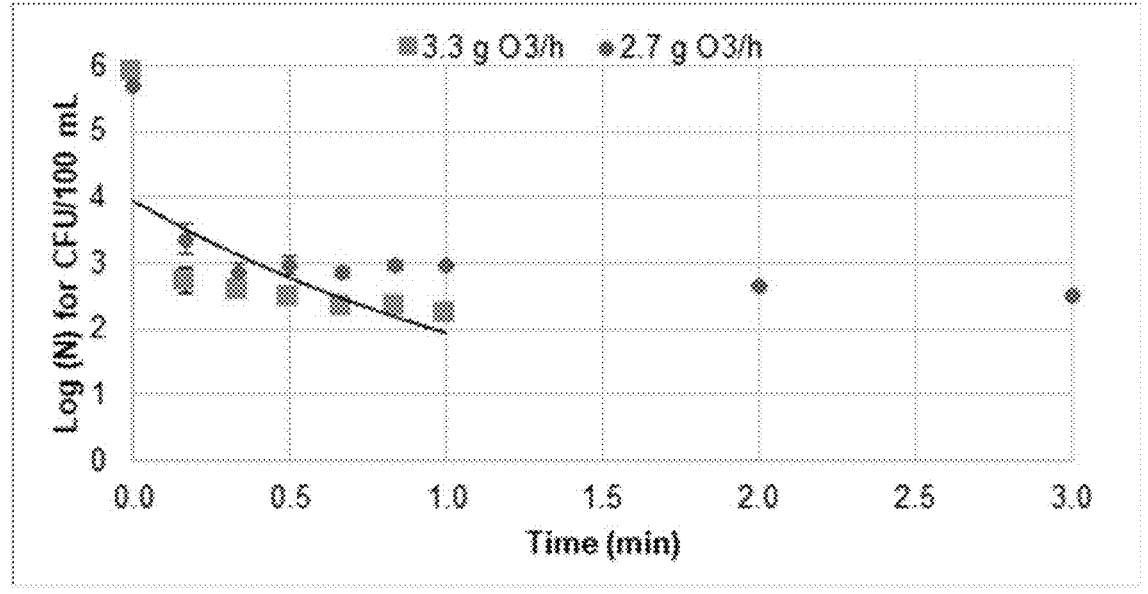
FIG. 6 is a graph of first order *E. coli* inactivation rates over time during ozonation comparing two different ozonation rates. $n=3$ for both data sets.
Figure 7:
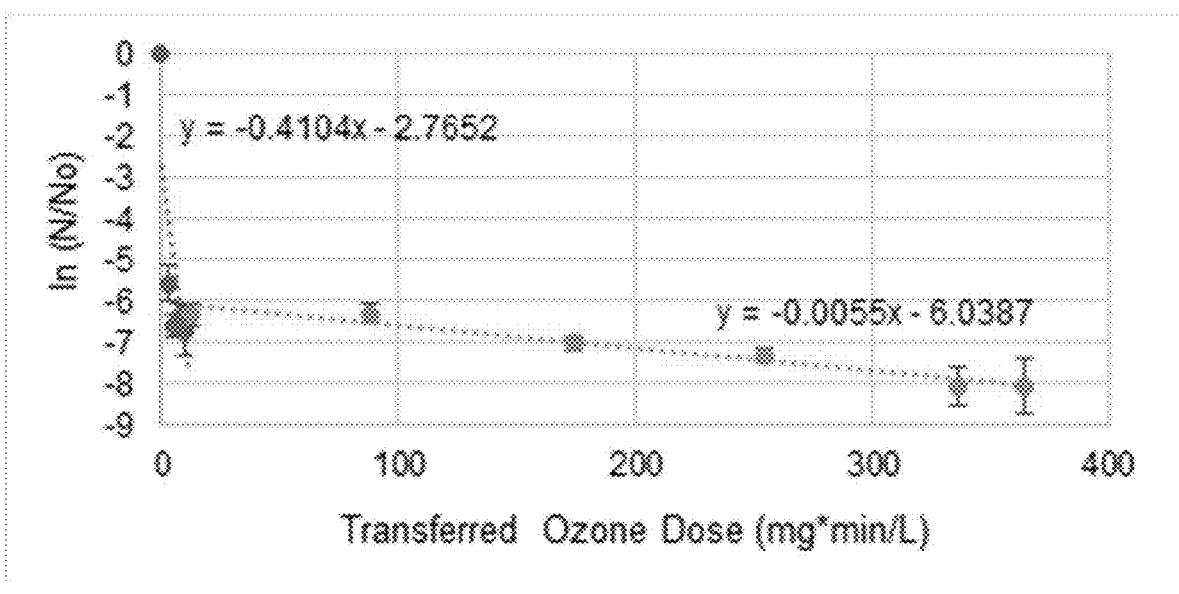
FIG. 7 is a graph of *E. coli* inactivation relative to TOD (function of time) after 5 min treatment time at AOD=2.7 g $O_3$/h, $n=3$.
Figure 8:
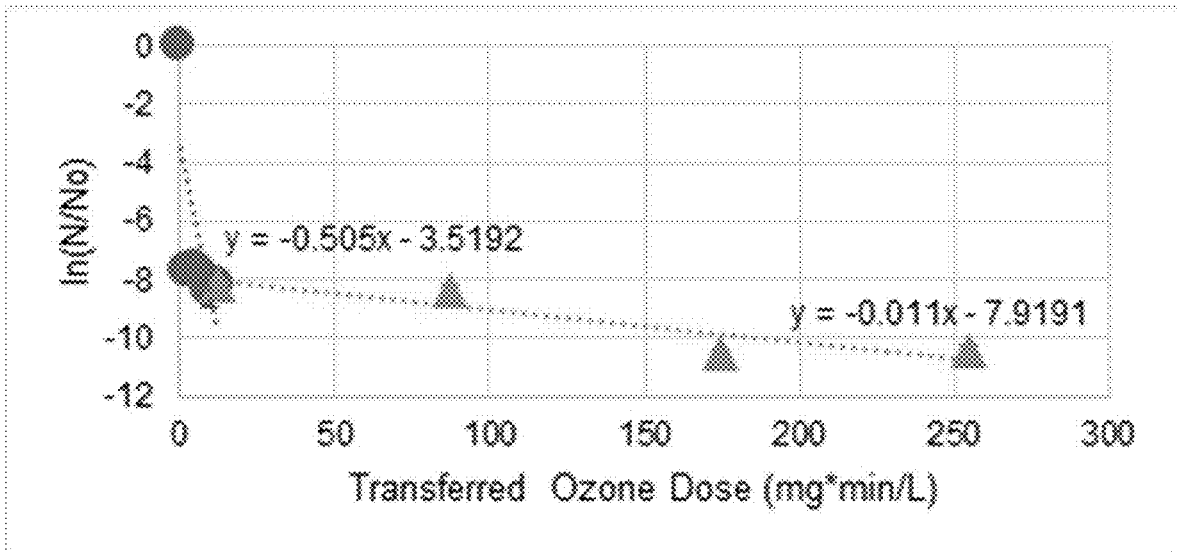
FIG. 8 is a graph of *E. coli* inactivation relative to TOD (function of time) after 5 min treatment time at AOD=3.3 g $O_3$/h, $n=3$.

The system AOD had a significant impact on the rate at which *E. coli* was inactivated by ozone. The two AODs tested were 2.7 g $O_3$/h and 3.3 g $O_3$/h and the pseudo-first order reaction rate constants were 0.18±0.06 min$^{-1}$ and 0.69±0.04 min$^{-1}$, respectively (p=0.0003) (FIG. 6). Due to the rapid nature of these tests (1-3 min), it was assumed that all the ozone applied to the reactor was transferred to the water (AOD=TOD). However, the AOD was not all consumed by the inactivation of *E. coli* because the water to be treated contained other contaminants which would have consumed or reacted with the ozone being transferred into the aqueous phase. Therefore, the TODs shown in FIGS. 7-8 are those applied to the entire system and the specific TOD attributed to *E. coli* inactivation was not determined.

The system AOD had a significant impact on the rate at which *E. coli* was inactivated by ozone. The two AODs tested were 2.7 g O3/h and 3.3 g O3/h and the pseudo-first order reaction rate constants were 0.18+0.06 min-1 and 0.69+0.04 min-1, respectively (p=0.0003) (FIG. 6). Due to the rapid nature of these tests (1-3 min), it was assumed that all the ozone applied to the reactor was transferred to the water (AOD=TOD). However, the AOD was not all consumed by the inactivation of *E. coli* because the water to be treated contained other contaminants which would have consumed or reacted with the ozone being transferred into the aqueous phase. Therefore, the TODs shown in FIGS. 7-8 below were those applied to the entire system and the specific TOD attributed to *E. coli* inactivation was not determined.

Fast and slow kinetic regimes were observed during batch testing (FIGS. 7-8) as described in Hunt & Mariñas (1997). The slope of each line represents the second order inactivation rate constant, k, as shown in the below equation:

$$\ln\frac{N}{N_o} = -k[O_3]t \qquad \text{(Equation 3)}$$

Where $N_o$ is the initial count of *E. coli* organisms, N is the surviving count of *E. coli* organisms after time, t (min), and at transferred ozone dose, $[O_3]$ (mg/L).

While no significant difference was observed between the fast kinetic regimes of each AOD system (p=0.08), the slow kinetic regime inactivation rate constant of the 3.3 g $O_3$/h system was twice that of the 2.7 g $O_3$/h system (p=0.03). This is likely due to the greater availability of oxidant to both react with organics in the synthetic SSO water and inactivate *E. coli* in the higher AOD system.

Example 2: 400-Liter Continuous Flow and Operation

A 400-liter continuous flow operation was tested using the provided systems and methods. A cloth media filter was used as the primary treatment process. Three oxidation treatment systems were used in series for treating the primary treated fluid, each oxidation treatment system had a volume of 130 liters. The operating conditions were as follows: water temperature: 19° C.-36° C., flow rate through system: 2.3-8 gallons per minute, pH: 6-12, applied $O_3$ dose: 110-280 mg $O_3$/L water, ozone application rate (OAR): 3-10 mg $O_3$/L-min, $O_3$ applied using injection method (via venturi).

Figure 9:
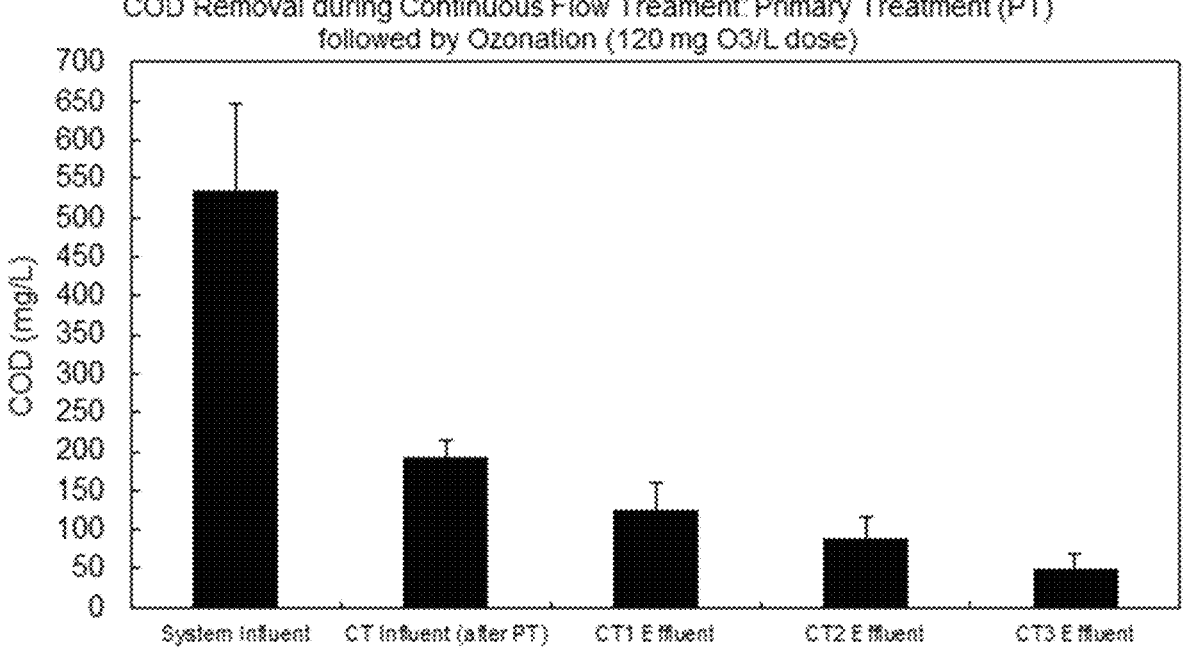
FIG. 9 is a graph that illustrates COD removal during continuous flow treatment using a primary treatment step followed by treatment with three oxidation treatment systems connected in series for various process stream effluents.

In addition to achieving greater than 90% COD removal across the system as is demonstrated in FIG. 9, the ozonation/oxidation system (CTs 1-3) achieved at least 5-log removal of *Escherichia coli* in less than 10 minutes.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An apparatus comprising:
a primary treatment system configured to remove solids from an untreated fluid comprising sanitary wastewater and/or stormwater to generate a primary treated fluid, wherein the primary treatment system consists of a porous filtration media system or a chemically enhanced primary treatment (CEPT) system;
an oxidation treatment system directly downstream of the primary treatment system, the oxidation treatment system including an inlet configured to receive the primary treated fluid, an ozone inlet configured to receive ozone from an ozone generator, and an outlet configured to dispense secondary treated fluid;
a controller in electrical communication with the ozone generator, the controller programmed to:
regulate the flow of ozone through the oxidation treatment system to maintain an ozone application rate (OAR) of least 2 mg $O_3$/L-min, such that an effective amount of ozone contacts the primary treated fluid to generate the secondary treated fluid, wherein the secondary treated fluid discharging from the oxidation treatment system has a chemical oxygen demand (COD) removal level of greater than 85%, as compared to the untreated fluid.

2. The apparatus of claim 1, wherein the porous filtration media system comprises porous filtration media composed of a porous cloth filter.

3. The apparatus of claim 1, wherein the CEPT system comprises a sedimentation vessel having an inlet configured to receive the untreated fluid, a sedimentation outlet configured to dispense solids from the sedimentation vessel, and a primary treated fluid outlet configured to dispense the primary treated fluid from the sedimentation vessel.

4. The apparatus of claim 1, wherein the controller is in electrical communication with a pump upstream of the oxidation treatment system, and wherein the controller is programmed to:
regulate the flowrate of primary treated fluid to maintain a detention time in the oxidation treatment system, and
wherein the secondary treated fluid discharging from the oxidation treatment system has a COD removal level of greater than 90%, as compared to the untreated fluid, with a detention time of less than 30 minutes.

5. The apparatus of claim 3 further comprising a reagent dosing unit, the reagent dosing unit comprising:
a plurality of vessels configured to contain a flocculent, a coagulant, and a polyelectrolyte; and
a pump configured to place the plurality of vessels in fluid communication with the CEPT system.

6. A method comprising:
(i) feeding an untreated fluid comprising sanitary wastewater and/or stormwater to a primary treatment system configured to remove solids from the untreated fluid to generate a primary treated fluid, wherein the primary treatment system consists of a porous filtration media system or a chemically enhanced primary treatment (CEPT) system;
(ii) oxidizing the primary treated fluid in an oxidation treatment system directly downstream of the primary treatment system, the oxidation treatment system having an inlet configured to receive the primary treated fluid, an ozone inlet configured to receive ozone from an ozone generator, and an outlet configured to dispense secondary treated fluid, and wherein the flow of ozone through the oxidation treatment system is controlled to maintain an ozone application rate (OAR) of least 2 mg 03/L-min, such that an effective amount of ozone contacts the primary treated fluid to generate the secondary treated fluid, wherein the secondary treated fluid discharging from the oxidation treatment system has a chemical oxygen demand (COD) removal level of greater than 85%, as compared to the COD of the untreated fluid.

7. The method of claim 6, wherein the CEPT system comprises a sedimentation vessel having an inlet configured to receive the untreated fluid from step (i), a sedimentation outlet configured to dispense solids from the sedimentation vessel, and a primary treated fluid outlet configured to dispense the primary treated fluid from the sedimentation vessel.

8. The method of claim 6, wherein the flow of ozone through the oxidation treatment system is controlled such that the secondary treated fluid discharging from the oxidation treatment system has a COD removal level greater than 90%, as compared to the untreated fluid.

9. The method of claim 6 further comprising regulating the flowrate of primary treated fluid to maintain a detention time in the oxidation treatment system, and wherein the secondary treated fluid discharging from the oxidation treatment system has a COD removal level of greater than 90%, as compared to the untreated fluid, with a detention time of less than 30 minutes.

10. The method of claim 6, wherein the OAR through the oxidation treatment system is regulated to range from 3 mg $O_3$/L-min to 10 mg $O_3$/L-min.

11. The method of claim 7 further comprising:

regulating the flowrate of a flocculent or a coagulant to the CEPT system to maintain a concentration of the flocculent or the coagulant of at least 5 mg/L.

12. The method of claim 11, wherein the method includes regulating the flowrate of the flocculent or the coagulant to the CEPT system to maintain a concentration of the flocculent or the coagulant from 40 mg/L to 80 mg/L.

13. The method of claim 11 wherein the flocculent or the coagulant comprises ferric chloride.

14. The method of claim 7 further comprising:

regulating the flowrate of a polyelectrolyte to the CEPT system to maintain a concentration of polyelectrolyte in the CEPT system to be at least 0.4 mg/L.

15. The method of claim 6, wherein the secondary treated fluid discharging from the oxidation treatment system has one or more of the following properties, as compared to the untreated fluid:

(i) a biochemical oxygen demand (BOD) removal of at least 90%;

(ii) a total suspended solids (TSS) removal of at least 99%;

(iii) a turbidity removal of at least 95%; and (iv) an *E. coli* removal of at least 99%.

16. The method of claim 15, wherein the one or more parameters (i-iv) of the secondary treated fluid discharging from the oxidation treatment system is obtained by maintaining a detention time within oxidation treatment system of less than 30 minutes.

* * * * *